(12) United States Patent
Kato

(10) Patent No.: US 6,396,714 B2
(45) Date of Patent: May 28, 2002

(54) ACTIVE CLAMPING FOR ZERO CURRENT ZERO VOLTAGE FORWARD CONVERSION

(75) Inventor: Tsutomu Kato, Yamanashi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/766,852

(22) Filed: Jan. 23, 2001

(30) Foreign Application Priority Data

Jan. 24, 2000 (JP) ........................................ 2000-014860

(51) Int. Cl.[7] ........................ H02M 3/335; H02H 7/122
(52) U.S. Cl. .................... 363/17; 363/56.02; 363/56.05
(58) Field of Search .................... 363/17, 56.02, 363/56.03, 56.04, 56.05, 98, 132

(56) References Cited

U.S. PATENT DOCUMENTS

| | | | |
|---|---|---|---|
| 4,959,764 A | * | 9/1990 | Bassett .......................... 363/16 |
| 5,066,900 A | * | 11/1991 | Bassett .......................... 323/224 |
| 5,132,889 A | * | 7/1992 | Hitchcock et al. ............. 363/17 |
| 5,877,951 A | * | 3/1999 | Mweene ........................ 363/98 |
| 5,886,884 A | * | 3/1999 | Baek et al. .................... 336/48 |
| 6,038,142 A | * | 3/2000 | Fraidlin et al. ................ 363/17 |
| 6,038,148 A | * | 3/2000 | Farrington et al. ......... 363/21.06 |
| 6,072,362 A | * | 6/2000 | Lincoln ........................ 330/10 |
| 6,191,960 B1 | * | 2/2001 | Fraidlin et al. ................ 363/25 |
| 6,208,529 B1 | * | 3/2001 | Davidson ...................... 363/17 |
| 6,246,599 B1 | * | 6/2001 | Jang et al. ................... 363/132 |
| 6,272,027 B1 | * | 8/2001 | Fraidlin et al. ................ 363/26 |

FOREIGN PATENT DOCUMENTS

| | | | |
|---|---|---|---|
| JP | 4-72882 | 6/1992 | ............ H02M/3/28 |
| JP | 4-308461 | 10/1992 | ............ H02M/3/28 |
| JP | 10-327577 | 12/1998 | .......... H02M/3/155 |

\* cited by examiner

*Primary Examiner*—Bao Q. Vu
(74) *Attorney, Agent, or Firm*—Sughrue Mion, PLLC

(57) ABSTRACT

The present invention discloses an active clamp forward converter that reduces the charging voltage of clamp capacitors as well as the voltage applied to switching elements, making it possible to reduce the on loss of the switching elements while also enabling the size of the capacitance elements to be reduced. The active clamp forward converter comprises first and second FETs which respectively connects first and second ends of a primary coil of the transformer to positive and negative terminals of a direct current power supply, and third and fourth FETs which respectively connects the first and second ends to the negative and positive terminals of a direct current power supply via capacitors, wherein the pair of first and second FETs and the pair of third and fourth FETs are alternately switched on and off sandwiched about a period when both are off.

14 Claims, 5 Drawing Sheets

(a) SWITCH 2, 14

(b) SWITCH 5, 11

$D = \dfrac{T_{on}}{T}$ (c) VOLTAGE BETWEEN A AND B (d) TRANSFER EXCITATION CURRENT

ACTIVE CLAMPING FOR ZERO CURRENT ZERO VOLTAGE FORWARD CONVERSION

BACKGROUND OF THE INVENTION

1. Field of the Invention

The present invention relates to an active clamp forward converter, and more particularly, to an active clamp forward filter having low levels of switching loss and conductance loss.

2. Description of the Related Art

FIG. 9 is a circuit drawing showing an example of the prior art of a single-transistor, forward active clamp circuit disclosed in Japanese Unexamined Utility Model Application, First Publication No. 4-72882. This circuit is equipped with a transformer 17 in which a first end of a primary coil is connected to the positive terminal of a direct current power supply 1 via an inductor 8, and a second end of a primary coil is connected to the negative terminal of a direct current power supply 1 via a switching element 2.

A capacitor 9 and a switching element 5 are additionally connected in series between the positive terminal of direct current power supply 1 and the second end of the primary coil of the transformer 17. In addition, a diode 3 and a capacitor 4 are connected in parallel to the switching element 2, and a diode 6 and a capacitor 7 are connected in parallel to the switching element 5.

The anode side of a diode 18 is connected to a first end of the secondary coil of the transformer 17, the anode side of a diode 19 and one end of a choke coil 20 are connected to a second end of the secondary coil of the transformer 17, the cathode side of diode 18 and the cathode side of the diode 19 are connected to the positive side of an output connector, and the other end of the choke coil 20 is connected to the negative side of an output terminal. In addition, an output capacitor (smoothing capacitor) 21 is connected between the output terminals to which a load 22 is connected.

The following provides an explanation of the operation of the example of the prior art of FIG. 9.

When switching the element 2 is controlled to on, an input voltage Vin of the direct current power supply 1 is applied to the inductor 8 and the primary coil of the transformer 17, and a current rises from the inductor 8 towards the primary coil of the transformer 17 resulting in accumulation of excitation energy.

When the switching element 2 is controlled to off after a fixed amount of time, the current is maintained in the same direction by the accumulated excitation energy. Consequently, the capacitor 7 is discharged simultaneous to charging of the capacitor 4, and the diode 6 takes on a forward direction bias and is turned on causing zero voltage to be held between the terminals of the switching element 5.

During this time, the switching element 5 is controlled to on and zero voltage switching is performed.

Although the current from the inductor 8 towards the primary coil of the transformer 17 charges the capacitor 4 and the capacitor 9, this current gradually decreases and finally inverts caused by resonance phenomena due to the inductance of the inductor 8 and transformer 17 and the capacitance of the capacitor 9.

Subsequently, although the switching element 5 is controlled to off, the current from the primary coil of the transformer 17 towards the inductor 8 is maintained, and together with charging the capacitor 7, charges the capacitor 4 to generate a forward direction bias in the diode 3 causing a zero voltage to be held between the terminals of the switching element 2.

During this time, the switching element 2 is controlled to on, zero voltage switching of the main current is performed, and the voltage Vin of the direct current power supply 1 is applied to the inductor 8 and the primary coil of the transformer 17.

As a result of repeating the above operation, the current flowing to the primary coil of the transformer 17 is controlled by zero voltage switching, and the voltage induced in the secondary coil is supplied to the load 22 after being rectified by the diodes 18 and 19 and smoothened by the choke coil 20 and the output capacitor 21.

As has been described above, in this active clamp circuits, switching loss is attempted to be reduced by switching the switching element on with the zero voltage between terminals, and when off, delaying the rise of the voltage by the capacitors connected in parallel.

Here, the voltage Vin of the direct current power supply 1 is applied to the inductor 8 and the primary coil of the transformer 17 when switching the element 2 is on, while a charging voltage VcO of the capacitor 9 is applied in the reverse direction when the switching element 2 is off. However, since the time product of the applied voltage when the switching element 2 is on and off is 0 based on the conditions of magnetic flux equilibrium, the following equation is valid when the on duty factor is taken to be D:

$$Vin \cdot D = VcO \cdot (1-D)$$

Thus, the charging voltage VcO of the capacitor 9 becomes as follows:

$$VcO = Vin \cdot D/(1-D) \tag{1}$$

In addition, a maximum voltage VswO applied to the switching element 2 or 5 becomes as follows:

$$VswO = Vin + VcO = Vin/(1-D) \tag{2}$$

As described above, the switching loss is reduced by a zero voltage switching or a zero current switching in the active clamp circuits. Though, in order to additionally reduce the loss caused by the on resistance of the FET (field effect transistor) used for switching element 2, it is preferable to increase the windings ratio of the primary and secondary coils of the transformer 17, decrease the current flowing to the switching element 2, and set the ratio of the maximum time at which the switching element 2 is switched on to the switching cycle, namely a maximum on duty factor Dmax, to 0.5 or more.

However, in the active clamp circuit of the prior art shown in FIG. 9, as shown in equations (1) and (2), as the on duty factor D increases, the charging voltage VcO of the capacitor 9 or the maximum applied voltage VswO of the switching element increases.

For example, if the voltage Vin from the direct current power supply 1 is taken to be 360 V, even if the the maximum on duty factor Dmax is 0.6, the voltage VcO applied to the capacitor 9 becomes 1.5 Vin=540 V in the case the on pulse has widened to the maximum on time during a sudden change in output current. In addition, the maximum voltage VswO applied to the switching element 2 ends up becoming Vin+VcO=900 V.

Consequently, the problem was encountered in which the maximum on duty factor Dmax ends up being restricted by the withstand voltage of the switching element or capacitor. In addition, if the maximum on duty factor Dmax is increased, the FET having a high withstand voltage is required for use as the switching element 2. In general, as the withstand voltage of the FET becomes higher, the on resistance of the FET also increases. Consequently, there was the problem of the conductance loss when the switching element 2 is on conversely increasing.

In addition, there was also the problem with respect to capacitor 9 in which, as the rated voltage becomes higher, the capacitor having a larger external shape is required.

The object of the present invention is to improve on these problems by providing an active clamp forward converter that reduces the maximum voltage applied to a switching element as well as the charging voltage of a capacitor, and allows the use of the switching element and a capacitor having lower withstand voltages, resulting in low on loss of the switching element and enabling the size of the capacitor to be made smaller as well as a wide control range for the on duty factor.

SUMMARY OF THE INVENTION

In order to solve the above problems, the active clamp forward converter as claimed in the present invention is equipped with:

a transformer having a primary coil of which one end is connected to a first contact, an inductor connected between the other end of the primary coil of this transformer and a second contact, a first switching element connected between the positive terminal of a direct current power supply and the second contact, a second switching element connected between the first contact and the negative terminal of the direct current power supply, a third switching element and a first capacitor connected in series between the positive terminal of the direct current power supply and the first contact, a second capacitor and a fourth switching element connected in series between the second contact and the negative terminal of the direct current power supply, first through fourth diodes respectively connected in parallel to each of the first through fourth switching elements, third through sixth capacitors respectively connected in parallel to each of the first through fourth switching elements, and a rectifying circuit connected to the secondary coil of the transformer; wherein, a pair of the first and second switching elements and a pair of the third and fourth switching elements are alternately controlled on and off sandwiched about a period during which they are both controlled to off.

As a result of adopting a constitution like that described above, the maximum voltage applied to each switching element can be reduced to ½ of that of the example of the prior art. In addition, when the maximum on duty factor is taken to be, for example, 0.6, the charging voltage of a clamp capacitor can be reduced to ⅓ that of the example of the prior art.

In addition, the active clamp forward converter as claimed in the present invention is characterized such that:

the inductor is substituted at the leakage inductance of the transformer, each of the first through fourth switching elements is composed of first through fourth FETs, each of the first through fourth diodes is composed of respective parasitic diodes of the first through fourth FETs, and each of the third through sixth capacitors is composed of the respective parasitic capacitance of the first through fourth FETs.

In addition, it is preferable that the above rectifying circuit is a half-wave rectifying or a full-wave circuit rectifying circuit which uses a diode for the rectifier.

In addition, it is preferable that the above rectifying circuit is a half-wave rectifying circuit or a full-wave rectifying circuit which uses an FET for the rectifier.

BRIEF DESCRIPTION OF THE PREFERRED EMBODIMENTS

The following provides an explanation of the embodiments of the present invention with reference to the drawings.

Figure 1:
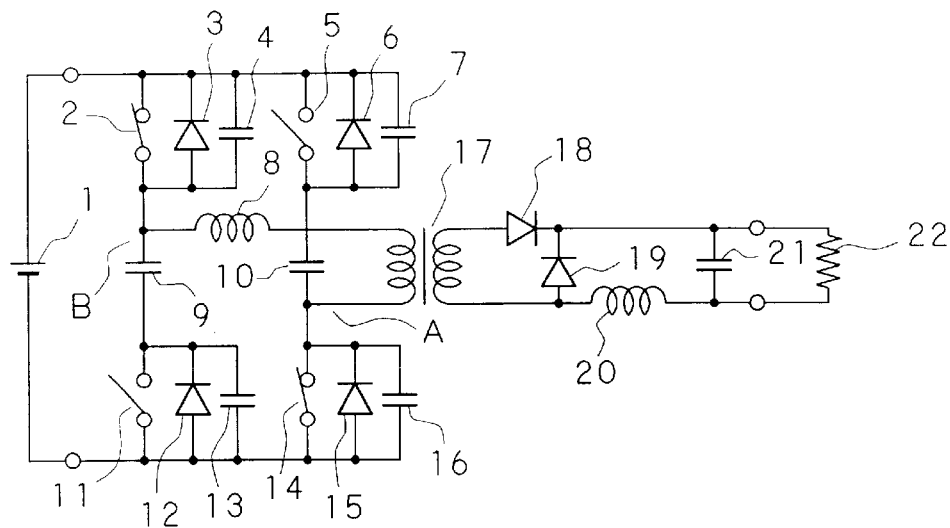
FIG. 1 is a circuit drawing showing an example of the constitution of an active clamp forward converter concerning an embodiment of the present invention.

FIG. 1 is a circuit drawing showing the example of a constitution of an active clamp forward converter concerning a first embodiment of the present invention.

The active clamp forward converter is equipped with: a transformer 17 in which one end of the primary coil is connected to a contact A, an inductor 8 connected between the other end of the primary coil of the transformer 17 and a contact B, a switching element 2 connected between the positive terminal of a direct current power supply 1 and the contact B, a switching element 14 connected between the contact A and the negative terminal of the direct current power supply 1, a switching element 5 and a capacitor 10 connected in series between the positive terminal of the direct current power supply 1 and the contact A, a capacitor 9 and a switching element 11 connected in series between the contact B and the negative terminal of the direct current power supply 1, diodes 3, 6, 12 and 15 connected in parallel to switching elements 2, 5, 11 and 14, respectively, capacitors 4, 7, 13 and 16 connected in parallel to switching elements 2, 5, 11 and 14, respectively, a diode 18 in which the anode is connected to a first end of the secondary coil of the transformer 17 and the cathode is connected to the positive output terminal, a diode 19 in which the anode is connected to a second end of the secondary coil of the transformer 17 and the cathode is connected to the positive output terminal, a choke coil 20 connected between a second end of the secondary coil of the transformer 17 and a negative output terminal, and an output capacitor 21 connected between both positive and negative output terminals.

Figure 2:
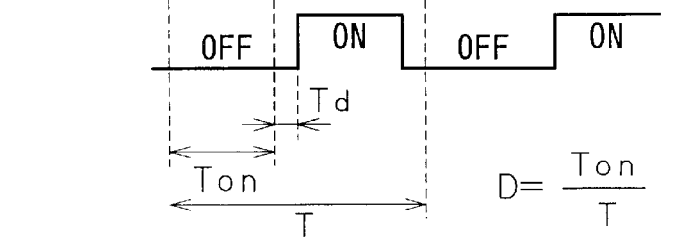
FIG. 2 is a time chart explaining the operation of an active clamp forward converter of FIG. 1.
Figure 2:
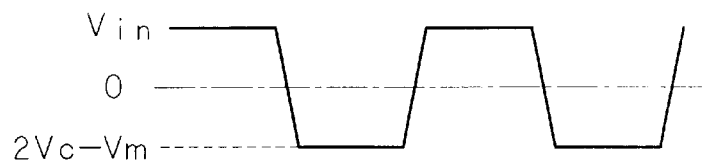
Figure 2:
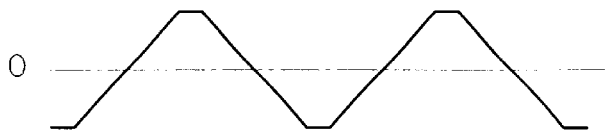

FIG. 2 is a time chart explaining the operation of the active clamp forward converter of the present embodiment. The following provides an explanation of the switching operation of the active clamp forward converter of the present embodiment with reference to FIGS. 1 and 2.

In the active clamp forward converter of FIG. 1, the switching elements 2 and 14 along with the switching elements 5 and 11 are alternately controlled on and off sandwiched about a dead time Td during which they are all off as shown in charts (a) and (b) in FIG. 2.

As shown in charts (c) and (d) in FIG. 2, during the period in which the switching elements 2 and 14 are on, an input voltage Vin is applied from the direct current power supply 1 between the series connection of the inductor 8 and the primary coil of the transformer 17, namely the contacts A and B, and excitation energy is accumulated.

When the switching elements 2 and 14 are controlled to off, together with the capacitors 3 and 16 being charged by the accumulated excitation energy, the capacitors 7 and 13 are discharged along a current path from the contact A to the contact B that passes through the capacitor 10, the capacitor 7, the direct current power supply 1, the capacitor 13 and the capacitor 9. This causes the diodes 6 and 12 to become biased in the forward direction and a zero voltage to be maintained between the terminals of the switching element 5 and the switching element 11.

At this time, if the capacitance of the capacitors 9 and 10 is taken to be equal and the voltage of both ends is taken to be Vc, respectively, the voltage at the contact B becomes Vc and the voltage at contact A becomes Vin−Vc, and a voltage of 2Vc−Vin is applied between the contacts B and A.

During this time, the switching elements 5 and 11 are controlled to off by zero voltage switching, and current that flows from the contact A to the contact B by way of the capacitor 10, the direct current power supply 1 and the capacitor 9 is gradually reduced and finally inverted due to resonance phenomena due to the inductance of the inductor 8 and the transformer 17 and the capacitance of the capacitors 9 and 10.

Following this inversion, the switching elements 5 and 11 are controlled to off, and the voltage of the capacitors 4 and 16 connected in series with the switching elements 2 and 14 is discharged from the state in which they are charged to the voltage of Vin−Vc by the excitation energy of the transformer 17 and the inductor 8. When the voltage of the capacitors 4 and 16 reaches zero volts, current flows to the diodes 3 and 15 connected in parallel to these switching elements.

During this time, the switching elements 2 and 14 are controlled to off, and zero voltage switching of the main current is performed resulting in the voltage Vin of the direct current power supply 1 being applied to the inductor 8 and the primary coil of the transformer 17.

As a result of repeating the above operation, the current that flows to the primary coil of the transformer 17 is controlled by zero voltage switching, and the voltage induced in the secondary coil is rectified by the diodes 18 and 19, smoothened by the choke coil 20 and the output capacitor 21, and supplied to the load 22.

As has been described above, in the active clamp forward converter of the present embodiment, the voltage Vin is applied between the contacts B and A, namely to the inductor 8 and the primary coil of the transformer 17 during the period in which the switching elements 2 and 14 are on, and the voltage 2Vc−Vin is applied during the period in which the switching elements 2 and 14 are off.

Accordingly, based on the conditions for magnetic flux equilibrium, the sum of the time products of the voltages applied to the contacts A and B during the periods in which the switching elements 2 and 14 are on and off becomes 0, and the following equations become valid when the on duty factor is taken to be D:

$$Vin \cdot D = (Vin - 2Vc) \cdot (1-D)$$

$$Vc = Vin \cdot (1-2D) / \{2(1-D)\} \quad (3)$$

In addition, a maximum voltage Vsw applied to the switching elements 2, 5, 11 and 14 becomes as follows:

$$Vsw = Vc - Vin = Vin / \{2(1-D)\} \quad (4)$$

Figure 9:
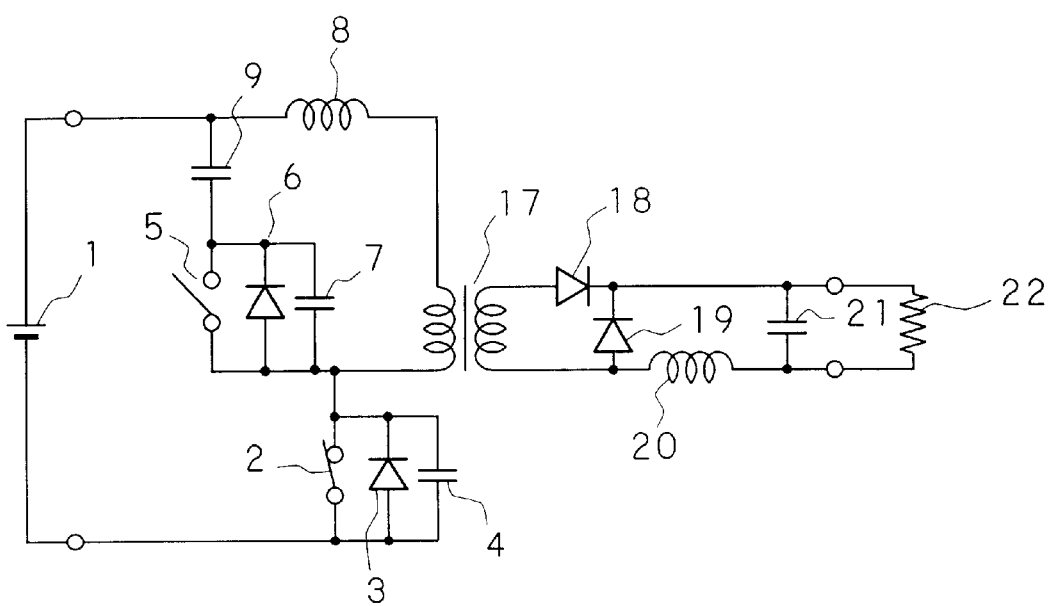
FIG. 9 is a circuit showing an example of the constitution of an active clamp forward converter of the prior art.

Thus, the Vsw can be reduced by ½ in comparison with a maximum applied voltage Vsw0 in the switching element in the example of the prior art of FIG. 9 as given in the previously mentioned equation (2). Accordingly, in the case of using a switching element having an equal withstand voltage as the case of setting the maximum on duty factor in the example of the prior art of FIG. 9 to 0.6, the maximum on duty factor can be further improved, and the conductance loss when the switching elements 2 and 14 are on can be reduced by increasing the primary and secondary windings ratio of the transformer. For example, when assuming the input voltage Vin of 360 V and a switching element withstand voltage of 900 V, the maximum on duty factor can be set to 0.8.

In addition, in the case the maximum on duty factor is set to 0.6, a withstand voltage of 450 V is only required for the switching elements, thereby enabling on loss to be reduced by using an FET having low on resistance.

In addition, as can be seen in equation (3), the charging voltage Vc of the capacitors 9 and 10 becomes positive when the on duty factor D is less than 0.5, and becomes 0 when D=0.5, resulting in a function in which a negative value is obtained if D>0.5 or more. The maximum value of this absolute value becomes Vin/2 for D=0 over a range of, for example, 0<D<Dmax=0.6, and in the case of 0<D<Dmax=0.8, becomes 1.5 Vin for D=0.8.

Thus, even when considering from the perspective of capacitor withstand voltage, the maximum on duty factor can be improved to 0.8 by using a capacitance element having a withstand voltage equal to that in the case of setting the maximum on duty factor to 0.6 in the example of the prior art of FIG. 9. In addition, in the case of setting the maximum on duty factor to 0.6, a capacitance element having a withstand voltage ⅓ that of the example of the prior art at which Vc0=1.5 Vin according to equation (1), thereby enabling the circuit to be reduced in size.

Figure 3:
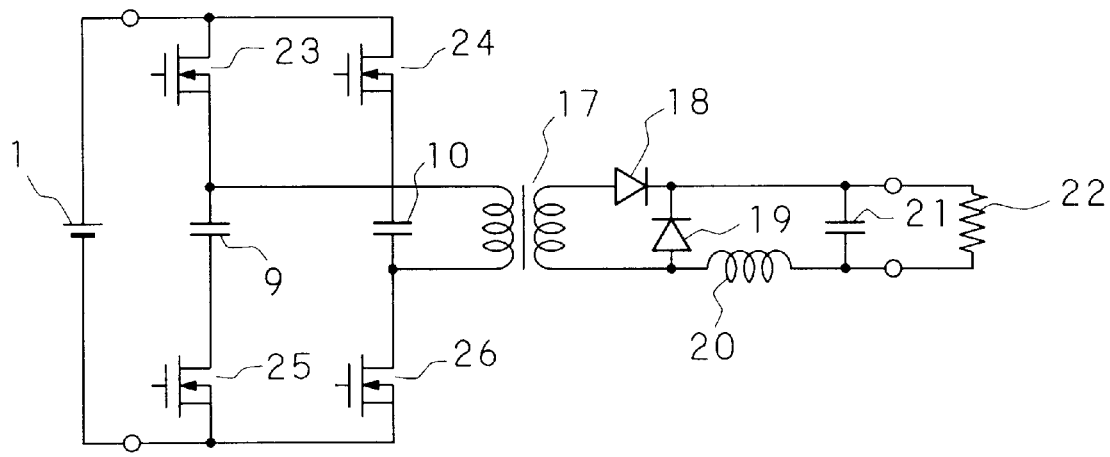
FIG. 3 is a circuit drawing showing another example concerning the embodiment of FIG. 1.

FIG. 3 is a circuit drawing showing an example of another embodiment of FIG. 1.

In the active clamp forward converter of FIG. 3, the switching elements 2, 5, 11 and 14 and the diodes 3, 6, 12 and 15 or the capacitors 4, 7, 13 and 16, to which they are respectively connected in parallel, are embodied at the output capacitance of FETs 23, 24, 25 and 26 and their respective parasitic diodes.

In addition, the inductor 8 is embodied at the leakage inductance of transformer 17. Since the operation is similar to the embodiment of FIG. 1, its repeated explanation is omitted.

Figure 4:
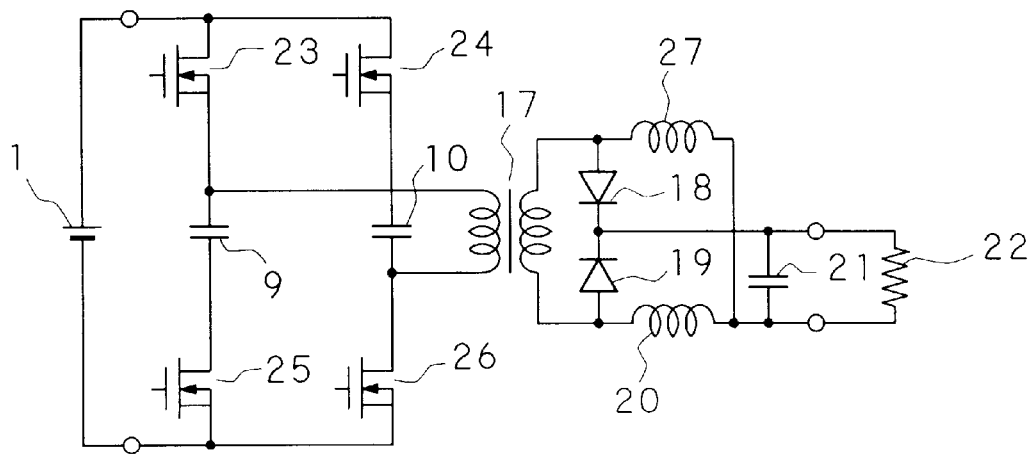
FIG. 4 is a circuit drawing showing an example of an active clamp forward converter concerning another embodiment of the present invention.

FIG. 4 is a circuit drawing showing an example of the active clamp forward converter of another embodiment. What is different from FIG. 3 is that this constitution is additionally equipped with a choke coil 27 between a first end of the secondary coil of the transformer 17 and the negative output terminal, and the secondary rectifying circuit of the transformer 17 is changed from a half-wave rectifying circuit to a full-wave rectifying circuit.

When the FET 23 and 26 are on and the FET 24 and 25 are off, the diode 18 is on and the diode 19 is off. Current is then supplied to the load 22 by a current loop comprising the transformer 17, the diode 18, the output capacitor 21 and the choke coil 20, and a current loop comprising the choke coil 27, the diode 18 and the output capacitor 21.

Next, when the FET 23 and 26 are off and the FET 24 and 25 are on, the diode 18 is off and the diode 19 is on. Current is then supplied to the load 22 by a current loop comprising the transformer 17, the diode 19, the output capacitor 21 and the choke coil 27, and a current loop comprising the choke coil 20, the diode 19 and the output capacitor 21.

Accordingly, current is always supplied to the load 22 by a loop which supplies the current from the transformer and a loop which discharges the current to the choke coil, and in comparison with the example of FIG. 3, the ripple current that flows to the output capacitor 21 can be reduced, and the capacitance of the output capacitor 21 can be lowered.

Figure 5:
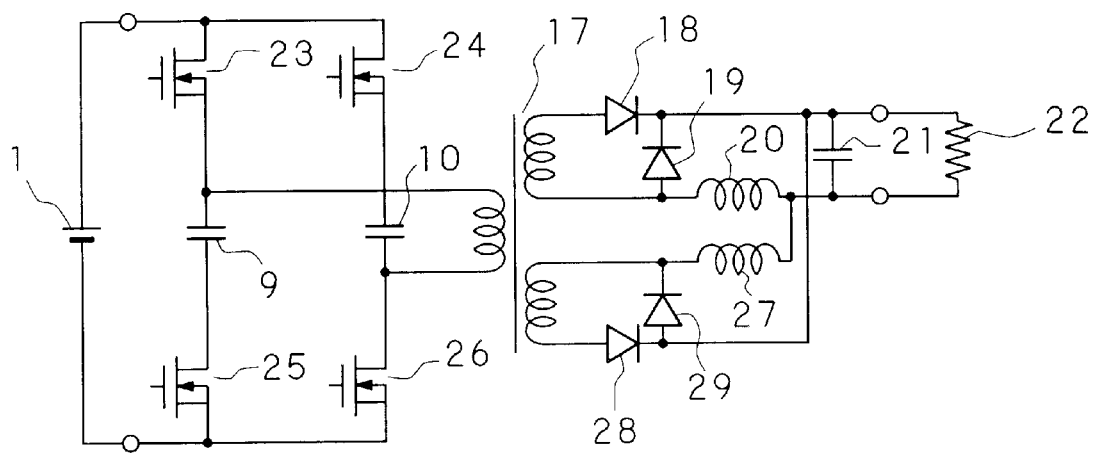
FIG. 5 is a circuit drawing showing an example of an active clamp forward converter concerning still another embodiment of the present invention.

FIG. 5 is a circuit drawing showing an example of an active clamp forward converter concerning still another embodiment. What is different from FIG. 3 is the use of a constitution equipped with a second secondary coil, a diode 28, in which the anode is connected to a first end of the second secondary coil and the cathode is connected to the positive output terminal, a diode 29, in which the anode is connected to a second end of the second secondary coil and the cathode is connected to the positive output terminal, and the choke coil 27 connected between a second end of the second secondary coil and the load output terminal, in the form of a half-wave rectifying circuit that rectifies a flyback voltage on the secondary side of the transformer 17.

In the present embodiment, when the FETs 23 and 26 are on and the FETs 24 and 25 are off, current is supplied to the load 22 by a current loop comprising the transformer 17, the diode 18, the output capacitor 21 and the choke coil 20, and by a current loop comprising the choke coil 27, the diode 29 and the output capacitor 21. When the FETs 23 and 26 are off and the FETs 24 and 25 are on, current is supplied to the load 22 by a current loop comprising the transformer 17, the diode 28, the output capacitor 21 and the choke coil 27, and by a current loop comprising the choke coil 20, the diode 19 and the output capacitor 21.

Thus, similar to the embodiment of FIG. 4, since current is always supplied from the transformer 17 by a current supply loop and a choke coil discharge loop, in addition to being able to lower the capacitance of the output capacitor 21, since there are two pairs of secondary coils of the transformer 17, the current value per coil becomes ½ that of the embodiment of FIG. 4. Moreover, since the rise and fall times of the current caused by leakage inductance of the transformer 17 are shortened, higher switching frequencies can be used.

Figure 6:
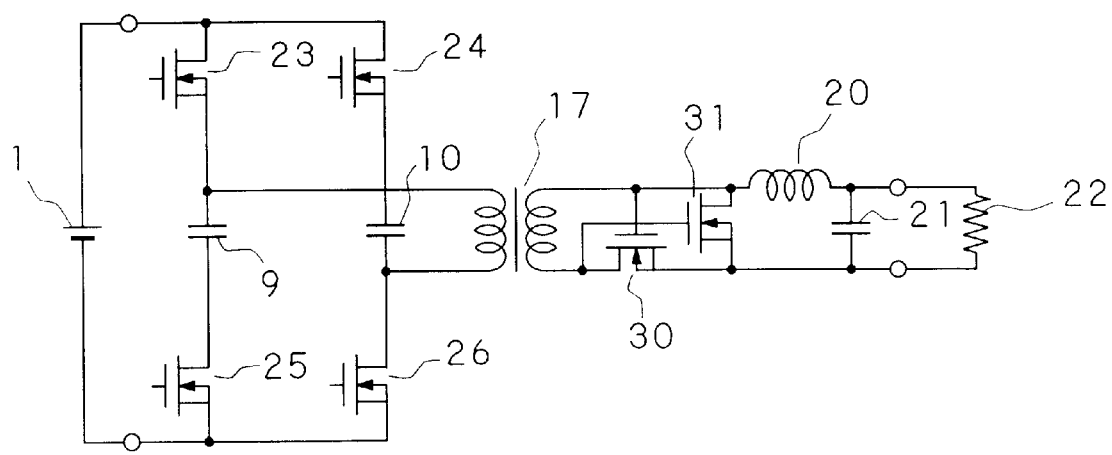
FIG. 6 is a circuit drawing showing still another example of the present invention.

FIG. 6 is a circuit drawing showing another still another example of the present invention. In this example, the rectifiers of the output half-wave rectifying circuit of the example of FIG. 3 have been changed from the diodes 18 and 19 to FETs 30 and 31. As a result of connecting the gates of the FETs 30 and 31 to the opposite ends of the source of the secondary coil of the transformer 17, the FETs 30 and 31 are alternately switched on and off, and similar to FIG. 3, rectify the secondary voltage of the transformer 17. As a result of changing the rectifiers from diodes to the FETs, forward voltage effects of the rectifiers when on can be reduced, thereby allowing improved conversion efficiency.

Figure 7:
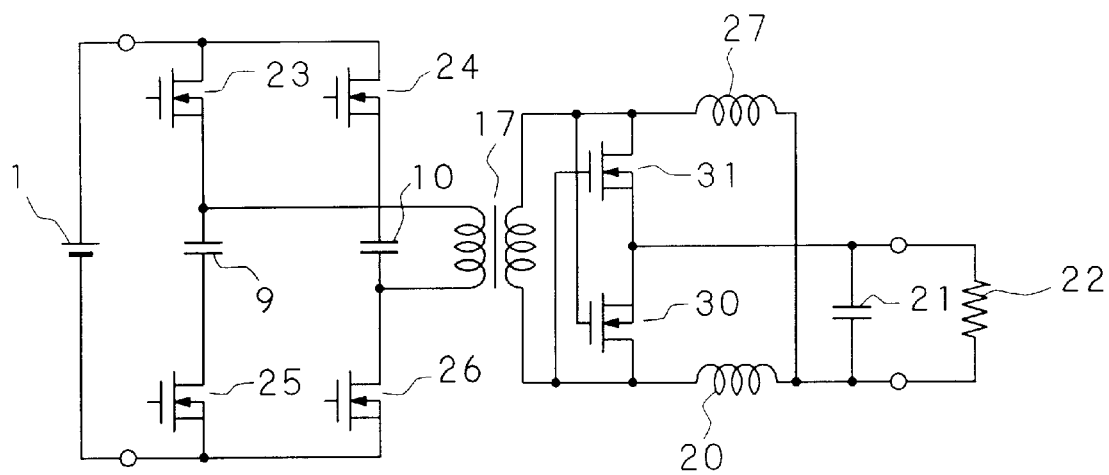
FIG. 7 is a circuit drawing showing still another example of the present invention.
Figure 8:
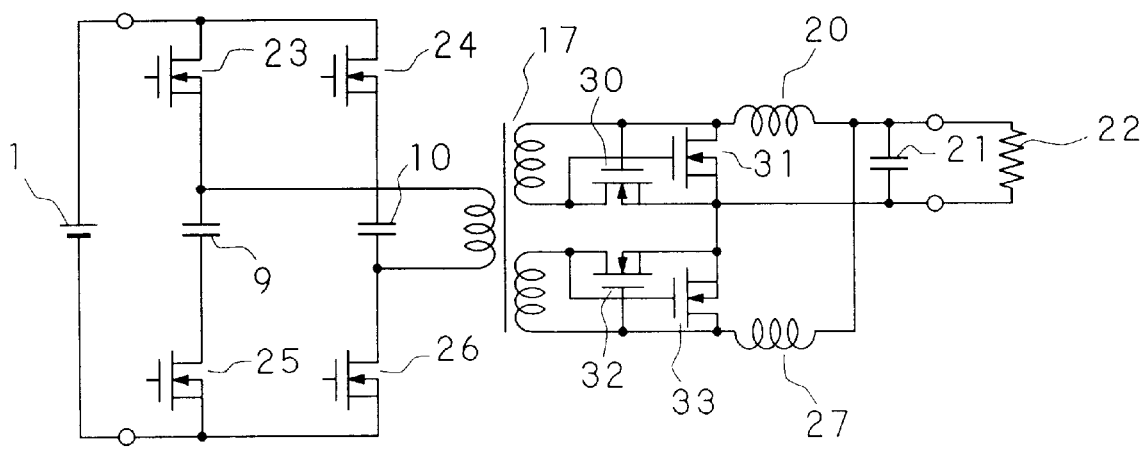
FIG. 8 is a circuit drawing showing still another example of the present invention.

FIGS. 7 and 8 are circuit drawings showing other examples of the present invention. In these examples, the diodes of the examples of FIGS. 4 and 5 have been replaced with FETs, and similar to FIG. 6, result in an improvement in conversion efficiency.

As has been explained above, according to the active clamp forward converter as claimed in the present invention, in addition to achieving a reduction in switching loss by using zero voltage switching and zero current switching.

Furthermore, the peak voltage applied to the switching elements as well as the charging voltage of the clamp capacitors can be significantly reduced in comparison with the single-transistor, forward active clamp circuit of the prior art, and therefore, it is possible to reduce on loss of the switching elements, expand the control range of the on duty factor, and reduce the size of the capacitance elements.

What is claimed:

1. An active clamp forward converter capable of switching a direct current supplied to a primary coil of a transformer between zero current and zero voltage, and inducing a voltage in a secondary coil after rectifying and smoothing said voltage, comprising:

a first FET (field effect transistor) connecting a first end of said primary coil to a positive terminal of a direct current power supply;

a second FET connecting a second end of said primary coil to a negative terminal of the direct current power supply;

a third FET connecting the first end of said primary coil to the negative terminal of the direct current power supply via a first capacitor; and a fourth FET connecting the second end of said primary coil to the positive terminal of said direct current power supply via a second capacitor;

wherein, said zero current/zero voltage switching of said direct current supplied to said primary coil of said transformer is performed by alternately controlling a first pair of transistors comprising said first and second FETs and a second pair of transistors comprising said third and fourth FETs to on and off states, said alternate on and off states being sandwiched between time periods during which both pairs are controlled to be in the off state.

2. An active clamp forward converter comprising:

a transformer having a primary coil with a first end connected to a first contact;

an inductor connected between a second end of the primary coil and a second contact;

a second switching element connected between said first contact and a negative terminal of a direct current power supply;

a third switching element and a first capacitor connected in series between a positive terminal of said direct current power supply and said first contact;

a second capacitor and a fourth switching element connected in series between said second contact and the negative terminal of said direct current power supply;

first through fourth diodes respectively connected in parallel to each of said first through fourth switching elements;

third through sixth capacitors respectively connected in parallel to each of said first through fourth switching elements; and a rectifying circuit connected to a secondary coil of said transformer wherein, a first pair of transistors comprising said first and second switching elements and a second pair of transistors comprising said third and fourth switching elements are alternately controlled to on and off states, said states being sandwiched between periods during which both pairs are controlled to be in the off state.

3. An active clamp forward converter according to claim 2 wherein, said inductor compensates for a leakage inductance of said transformer;

each of said first through fourth switching elements is composed of respective first through fourth FETs;

each of said first through fourth diodes is composed of respective parasitic diodes of said first through fourth FETs; and each of said third through sixth capacitors is composed of the respective parasitic capacitance of said first through fourth FETs.

4. An active clamp forward converter according to claim 2 wherein, said rectifying circuit is a half-wave rectifying circuit that uses a diode to perform rectification.

5. An active clamp forward converter according to claim 3 wherein, said rectifying circuit is a half-wave rectifying circuit that uses a diode to perform rectification.

6. An active clamp forward converter according to claim 2 wherein, said rectifying circuit is a full-wave rectifying circuit using a diode to perform rectification.

7. An active clamp forward converter according to claim 3 wherein, said rectifying circuit is a full-wave rectifying circuit using a diode to perform rectification.

8. An active clamp forward converter according to claim 2 wherein, said rectifying circuit is a half-wave rectifying circuit that uses an FET to perform rectification.

9. An active clamp forward converter according to claim 3 wherein, said rectifying circuit is a half-wave rectifying circuit that uses an FET to perform rectification.

10. An active clamp forward converter according to claim 2 wherein, said rectifying circuit is a full-wave rectifying circuit that uses an FET to perform rectification.

11. An active clamp forward converter according to claim 3 wherein, said rectifying circuit is a full-wave rectifying circuit that uses an FET to perform rectification.

12. An active clamp forward converter as claimed in claim 1, wherein respective capacitance values of said first and second capacitors are substantially equal.

13. An active clamp forward converter as claimed in claim 2, wherein respective capacitance values of said first and second capacitors are substantially equal.

14. An active clamping circuit for a forward converter comprising:

a transformer with a primary coil connected to a dc power supply and a secondary coil rectifying an induced voltage;

a first switching element connecting a first end of the primary coil to a positive terminal of the dc power supply;

a second switching element connecting a second end of the primary coil to a negative terminal of the dc power supply;

a third switching element connecting the first end of the primary coil to the negative terminal of the dc power supply via a first capacitor;

a fourth switching element connecting the second end of the primary coil to the positive terminal of the dc power supply via a second capacitor; and an on/off control controlling a pair of the first and second switching elements and a pair of the third and fourth switching elements to be alternately turned on or off with a desired on-duty ratio, wherein a prescribed dead time in which all of the first and fourth switching elements are off is provided between a timing at which both of the first and second switching elements are turned off and a timing at which both of the third and fourth switching elements are turned on.

* * * * *